(12) United States Patent
O'Ceallaigh

(10) Patent No.: US 12,065,218 B2
(45) Date of Patent: Aug. 20, 2024

(54) LOW-COST VISCOUS-DRAG-REDUCING CLADDING

(71) Applicant: Micheal O'Ceallaigh, Dublin (IE)

(72) Inventor: Micheal O'Ceallaigh, Dublin (IE)

( * ) Notice: Subject to any disclaimer, the term of this patent is extended or adjusted under 35 U.S.C. 154(b) by 421 days.

(21) Appl. No.: 17/622,351

(22) PCT Filed: Jun. 29, 2020

(86) PCT No.: PCT/EP2020/068282
§ 371 (c)(1),
(2) Date: Dec. 23, 2021

(87) PCT Pub. No.: WO2020/260705
PCT Pub. Date: Dec. 30, 2020

(65) Prior Publication Data
US 2022/0242525 A1   Aug. 4, 2022

(30) Foreign Application Priority Data

Jun. 27, 2019 (IE) .................................... 2019/0104

(51) Int. Cl.
*B63B 1/38* (2006.01)
*B63B 1/34* (2006.01)
*B63B 59/02* (2006.01)

(52) U.S. Cl.
CPC .................. *B63B 1/38* (2013.01); *B63B 1/34* (2013.01); *B63B 2001/387* (2013.01); *B63B 2059/025* (2013.01)

(58) Field of Classification Search
CPC ....... B63B 1/38; B63B 1/34; B63B 2001/387; B63B 2059/025; B63B 59/02
See application file for complete search history.

(56) References Cited

U.S. PATENT DOCUMENTS

2010/0166964 A1*  7/2010  Go ............................. F15D 1/10
                                                                    264/129

FOREIGN PATENT DOCUMENTS

| WO | WO2004/012987 A2 | 2/2004 |
| WO | WO2014/165106 A1 | 10/2014 |
| WO | WO-2019122439 A1 * | 6/2019 ............... B63B 1/34 |

OTHER PUBLICATIONS

International Search Report from corresponding International Patent Application No. PCT/EP20/68282, dated Oct. 26, 2020.

* cited by examiner

*Primary Examiner* — Stephen P Avila
(74) *Attorney, Agent, or Firm* — KUSNER & JAFFE

(57) ABSTRACT

A low-cost viscous-drag-reducing cladding for a ship's hull comprising airbags whose outer surfaces are adapted to be water repelling. Each airbag comprises a plenum that comprises substantially open space, which does not obstruct the flow of air through it. The airbags are inflated with compressed air to a pressure higher than the adjoining hydrostatic pressure. The airbag material comprises a reinforcing fabric, which is adapted to withstand the forces encountered during operation, and is sealed with a sealant so as to be made substantially impermeable to air. The outer water-repelling surface of each airbag is connected to a plenum by means of restrictor holes. Air flows from the plenum through the restrictor holes into the water-repelling layer.

21 Claims, 6 Drawing Sheets

LOW-COST VISCOUS-DRAG-REDUCING CLADDING

FIELD OF THE INVENTION

The present invention relates to the reduction of viscous drag, more particularly to the reduction of viscous drag on the hulls of marine vessels and other liquid-contacting surfaces.

BACKGROUND OF THE INVENTION

Viscous drag occurs because of the phenomenon known in fluid mechanics as the 'no slip' boundary condition at the solid/liquid interface. The layer of liquid molecules adjoining the solid does not move relative to the solid. Shear forces are generated between this layer and the adjoining layers of liquid. This condition is known to apply to vessels moving through liquids, as is the case of ships travelling through the sea. It also applies in the case of liquid flowing through pipes, such as oil through a pipeline, or liquid through a heat exchanger. Air has a viscosity approximately one thousand times smaller than water. It has long been known that if air can be interspersed between the liquid and solid in such a way as to completely separate the liquid from the solid, that the viscous drag in the liquid will effectively be eliminated.

Viscous drag accounts for most of the fuel required to propel large ships. As the shipping industry is a large global producer of greenhouse gases, so reducing fuel consumption due to viscous drag will result in large reductions in environmental damage and large economic savings.

Plants, such as the lotus leaf and certain insects exhibit the characteristic of trapping air on their surface. This effect is typically generated by a hydrophobic surface, along with a complex surface topography, often comprising hierarchical structures. This property greatly reduces their wetted surface areas. This non-wetting property is commonly known as 'the Lotus effect'. Many laboratory materials have been tested to replicate this effect seen in nature. While materials designed to mimic this effect may work briefly when tested just below the water surface, none have been shown to work over an extended time at the hydrostatic pressures encountered by the hulls of modern shipping. Hulls of 20 m depth are common on oil tankers today. At that depth, the hull encounters hydrostatic pressures of 2 Bar, equivalent to 0.2 $N/mm^2$. Furthermore, ocean waves of 5 m height are normal, and waves of 10 m are not uncommon. Surface tension forces are miniscule by comparison. Water has a surface tension of 72 mN/m. The hydrostatic force at 20 m depth is equivalent to the surface tension force of almost 3 meters length of a completely hydrophobic material in each square millimetre. Thus, hydrostatic forces are far greater than the surface tension forces that non-wetting materials rely on. On its own, this non-wetting behaviour is limited to near surface instances only. A further limitation of the 'Lotus effect' is that, over time, the trapped air diffuses into the water leaving the surface saturated with water. Materials replicating this principle would not be of benefit to ships that must spend a year or more between trips to dry dock. It is clear that such materials do not offer a solution to the problem of viscous drag on the hulls of ships.

U.S. Pat. No. 5,456,201 discloses a method of blowing bubbles through a ship hull. However, the holes themselves are large, causing the air that emerges to form large bubbles. Thus the hull surface remains wetted. This leads to the physical phenomenon known as 'bubbly flow'. The viscosity of the water is reduced leading to a reduction in the viscous drag force. However, bubbly flow also causes a reduction in the density of the water, and a reduction in its buoyancy force. The large power requirement necessary to produce the large volume flow of air bubbles tends to offset the power reduction from reduced viscous drag on the hull. As a result, this system has not found favour in industry.

U.S. Pat. No. 9,630,373 discloses a hydrophobic layer which traps air on the hull surface which is connected by means of a gas-permeable ply to a replenishable reservoir comprised of a porous medium. The gas-permeable ply is between 0.5 and 5 microns thick, and lacks the robustness necessary to survive in the marine environment. The porous media of the replenishable reservoir presents a significant barrier to air flow, and significant air pressure gradients occur when air flows through it. The object of the invention is that when subject to increased hydrostatic pressure from a wave, the air in the air-retaining layer is not ejected into and lost to the sea, but instead is driven from the air-retaining layer into the reservoir. However, collapse of the air layer results. There is no mechanism to provide sufficient restoring force to re-establish the air layer, and the air layer is lost permanently as a result. Flooding of the air reservoir is then likely to occur shortly thereafter. This results in an increase in viscous drag.

The world has roughly 100,000 ocean-going vessels that produce up to 3% of global $CO_2$ emissions and consumes approximately 7% of global oil production. An estimated 400,000 people die prematurely, and a further 14 million new cases of childhood asthma occur each year from pollution associated with shipping. Therefore there exists an urgent need for a solution to the problem of viscous drag on ships and other marine vessels.

SUMMARY OF THE INVENTION

According to the present invention there is provided a cladding for a ship hull comprising: at least one airbag comprising a plenum that comprises substantially open space which is pressurised with air in use; wherein said airbag is formed from a material comprising a reinforcing fabric that is substantially sealed with a sealant; the airbag further comprising an outer surface layer adapted to be water-expelling, the outer surface layer connected to the plenum via at least one restrictor hole in the airbag through which air from the plenum can pass to provide pressurised air in the water-expelling layer having a pressure level substantially equal to, or greater than, an adjoining hydrostatic pressure.

The airbag may be sealed with a vulcanised rubber. The vulcanised rubber may be selected from at least one of CSM, CR, EPDM, or silicone. Alternatively, the airbag may be sealed with a thermoplastic polymer. The thermoplastic polymer may be selected from at least one of thermoplastic CSM or thermoplastic polyurethane.

The reinforcing fabric may comprise a woven fabric. The airbag may comprise at least two layers or sheets of reinforcing fabric and drop stitching between said at least two layers or sheets of said reinforcing fabric. The reinforcing fabric may comprise drop stitching between outer and inner layers of said reinforcing fabric. The reinforcing fabric may comprise a yarn selected from at least one of polyester, para-aramid, meta-aramid, glass fiber, polyamide, polypropylene, PEEK, UHMPE, steel, carbon fiber. The material may comprise a laminate comprising at least one fabric-reinforced layer. The at least one restrictor hole may be formed by mechanical perforation. The at least one restrictor hole may be formed by laser drilling. The at least one restrictor hole may be formed by feeding at least one hollow fiber through the airbag material such that one end of each hollow fiber terminates in said plenum, and the other end of each hollow fiber terminates in the water-expelling outer surface layer. The restrictor hole may be formed by securely attaching a hollow fiber to the outer fabric-reinforced surface layer such that one end of said fiber terminates in said plenum, and the other end terminates in the water-expelling layer on the opposing side of the said reinforced fabric. The outer surface layer may comprise means for forming closely packed air pockets on said outer surface layer, and where the radius of each air pocket is less than twice the capillary length of water, and wherein each air pocket is connected to said plenum by at least one restrictor hole.

The airbag may be adapted to be water-expelling by forming closely packed air pockets on said outer layer, and where the radius of each air pocket may be less than twice the capillary length of water, and wherein each air pocket may be connected to said plenum by at least one restrictor hole.

The outer surface layer may comprise loops of hydrophobic fiber woven into the reinforcing fabric of said airbag material. The outer surface layer may be adapted to be water-expelling by weaving loops of hydrophobic fiber into the reinforcing fabric of said upper layer.

The outer surface layer may comprise a layer of hydrophobic loops attached to an outer side of said reinforcing fabric by adhesion bonding. The outer surface layer may be adapted to be water-expelling by attaching a layer of hydrophobic loops to the outer side of said reinforcing fabric by adhesion bonding. The layer of hydrophobic loops of fiber may be formed by means of one of weaving, knitting or electrospinning. The surface layer may be adapted to be water-expelling by forming hooks on said upper surface layer, and separately forming a layer of hydrophobic loops of fiber by means of weaving or knitting or electrospinning, and attaching said hydrophobic loops to said hooks by pressing them together so they interlock and form a mechanical bond with each other. The hydrophobic loops may be made of a material selected from one of ePTFE, polyester, polyamide, polypropylene, polyethylene or other hydrophobic polymer. The hydrophobic loops may comprise a hydrophilic or weakly-hydrophobic fiber which is treated with a coating so as to increase its hydrophobicity. The fiber may be selected from at least one of polyester, para-aramid, meta-aramid, glass fiber, polyamide, polypropylene, PEEK, UHMPE, steel, or carbon fiber. The coating may be selected from one of PTFE, PFA, or wax.

According to the present invention there is further provided a cladding for a ship hull comprising at least one airbag that comprises a material with an outer surface layer that is adapted to be water-expelling, and a plenum that comprises substantially open space pressurised with air; wherein said material comprises a reinforcing fabric that is substantially sealed with a sealant so as to be made impermeable to air, and is adapted to withstand the pressure in said plenum; wherein the air pressure in said plenum is higher than the hydrostatic pressure in the sea immediately adjoining the airbag; wherein the water-expelling outer surface layer is connected to the plenum via at least one restrictor hole; and wherein the pressure in the plenum is adapted so as to pressurise the air in the water-expelling layer to a level substantially equal to, or greater than, the adjoining hydrostatic pressure.

Accordingly, there is provided a cladding for a ship comprising airbags. In accordance with one embodiment, the airbags are constructed of woven fabric, comprising an outer/upper layer (distal to the hull) and a lower/inner layer (closer to the hull), which are connected to each other using drop stitches. The fiber of the drop stitch may be interwoven with both the upper and lower layers to provide structural strength to the airbag. The fabrics may be sealed with vulcanised rubber. The outer surface may be adapted to be water-expelling. This may be done by means of forming a multitude of densely packed air pockets on the outer surface of the outer layer, herein called 'the outer surface', where the scale length of the air pocket may be less than twice the capillary length of water. The inlet of each air pocket may be supplied with pressurised air via a restrictor, which ideally connects the air pockets to the airbag plenum. The cross-sectional area of the restrictor is preferably less than one hundredth, and most preferably less than one thousandth, of the cross-sectional area of the pocket's outlet. The inlet of each restrictor may be connected to the airbag plenum. The plenum may comprise a space that does not obstruct the flow of air through it such that the air pressure is substantially uniform throughout the plenum. The plenum may be connected to at least one pressurised air source. Alternatively, the outer surface may be adapted to be water-expelling by forming a fibrous layer the outer surface comprising loops of fiber which are hydrophobic, and this fibrous layer may be connected to the airbag plenum via restrictor holes. The air distribution system may be used to prevent biofouling of the cladding by occasionally passing an anti-fouling gas through the system instead of air. The favoured anti-fouling gas comprises ozone mixed in suitable concentration with air.

Other objects and advantages of the present invention will become apparent from the following description and accompanying drawings. The viscous-drag-reducing property of this invention can be beneficially used in various applications such, but not limited to ships' and submarine hulls, torpedoes, oil and chemical pipelines, and the like.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
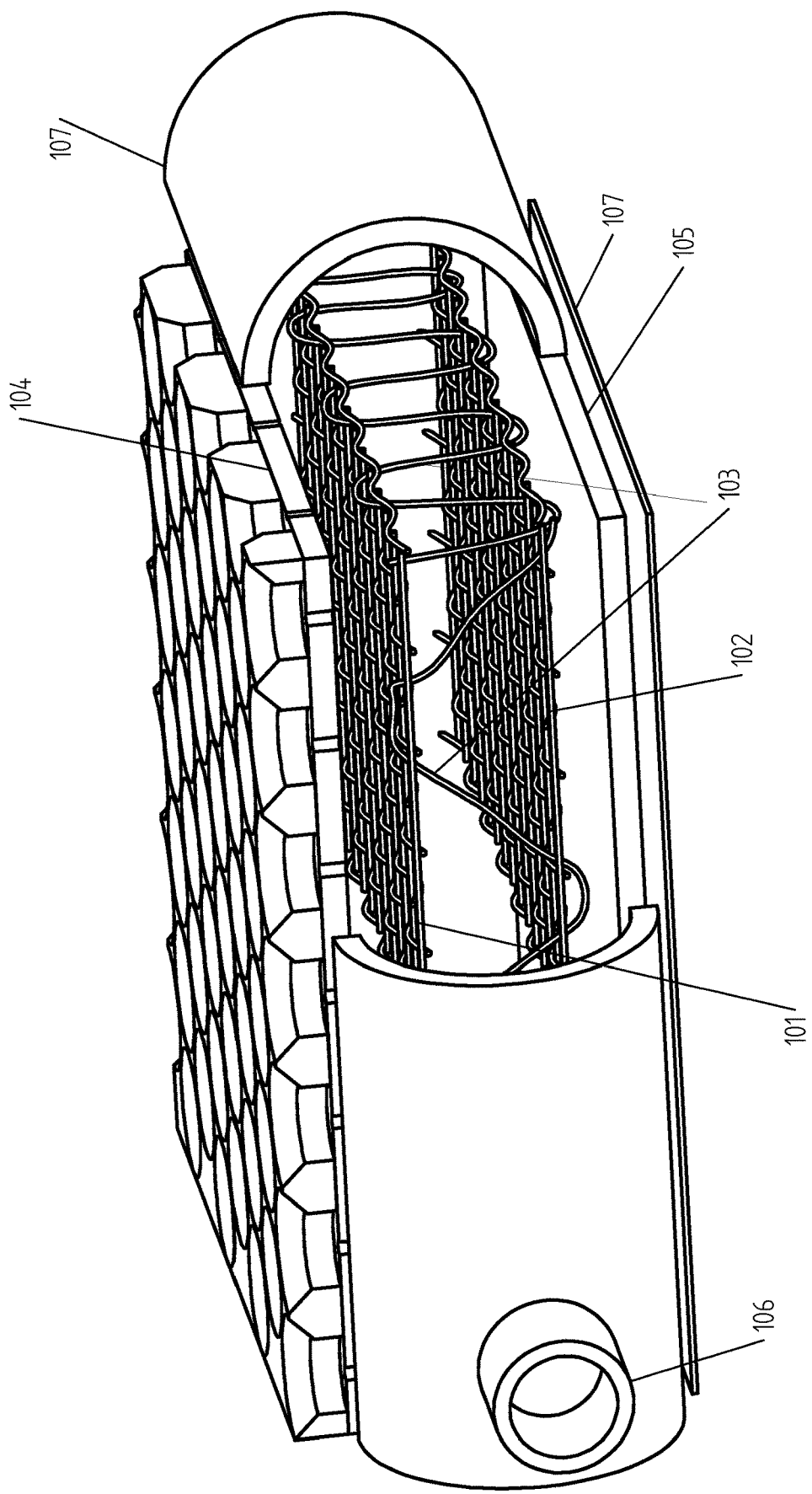
FIG. 1 illustrates an exploded isometric view with a broken-out section of an embodiment of a viscous-drag-reducing airbag in accordance with the present invention suitable for use as a cladding on the surface of a ship's hull.

One embodiment of a cladding for a ship's hull in accordance with the present invention is shown in FIG. 1. It is useful to first explain some of the terms that are used herein. Embodiments of the invention are described below in terms of the viscous drag reduction on a ship's hull travelling through water. However, the cladding of the invention is also suitable for use with vessels and objects such as submarines and missiles travelling through fresh water or seawater. It also has application in the field of oil, water, or other liquids being pumped along a pipeline. As used herein, the term vessel is used to describe any ship, submarine, torpedo, pipeline or any other solid object whose surface is normally subject to viscous drag from its relative movement with respect to a liquid. As used herein, the terms sea and water shall refer to water, oil or any other liquid in which the viscous drag occurs. The term hull shall refer to the surface of the ship, submarine, torpedo, pipeline or any other solid object that immediately adjoins the water. Where the invention is described in terms of a ship moving through a liquid, it should be appreciated that it also applies to a liquid moving through a fixed structure such as a pipeline. The cladding surface that adjoins the water is referred to as the outer surface. The opposite cladding surface that adjoins the hull is referred to as the inner surface. Reference to hydrostatic pressure of the sea equally applies to the hydrostatic pressure of freshwater, oil or other liquid adjoining the cladding.

Accordingly, the present invention is not limited to the reduction of the viscous drag on the hulls of ships. It is also directed to the reduction of viscous drag on the hulls of vessels and objects that travel over water, or submerged under water such as submarines, and torpedoes. It is also directed to reduction of viscous drag on the inner surface of pipes or ducts where liquid travels through pipes or ducts, such as in the chemical industry where liquids such as oil are pumped along pipelines.

Ship hulls operate in a harsh environment and this invention is designed to be suitable to operate successfully in this environment. Ship hulls are exposed to high levels of ultraviolet light (UV) and ozone, and must be designed to withstand large temperature fluctuations. Parts of the hull are immersed in cold salt water when fully laden, and subject to intense sunlight when unladen. The cladding, particularly at the bow of the ship, may be subject to enormous impact forces from the slamming of breaking waves. The bottom of the ship may be subject to the abrasive action of water bearing silt or sand. The wetted area of the ship is subject to the growth of microorganisms, which is left untreated can lead to the growth of larger organisms such as molluscs.

The term 'wetted area' of a hull is normally used to describe the area of a ship's hull surface that lies beneath the waterline. Where all of the submerged area is wetted, there is no need to distinguish between the 'wetted area' and the 'submerged area'. As used herein, the term 'submerged area' shall refer to the area of the ship's hull surface that lies below the waterline. The term 'wetted area' shall refer only to that portion of the 'submerged area' that is wetted by water. The 'non-wetted area' means the area of the hull surface below the waterline that is not wetted. The internal area of the pockets, as explained later with reference to the drawings, is not included in this calculation. The 'percentage non-wetted area' is the 'non-wetted area' expressed as a proportion of the 'submerged area'. The 'percentage non-wetted area' is a useful measure of the efficiency of this invention and correlates with the proportion of viscous drag reduction. Where reference is made to a cladding it should be appreciated that the cladding may cover the entire submerged area of a ship's hull, or be applied to just a portion of this. The invention is described in terms of a cladding, but may usefully form part of the structural integrity of the vessel, as in the case with rigid inflatable boats (RIBs), and the like.

When a drop of water, in its steady state, makes a contact angle of greater than 90° on the surface of a material, the material is said to be hydrophobic. When the liquid drop consists of oil, the material is said to be oleophobic. In general, when a drop of any liquid makes a contact angle of greater than 90° on the surface of a material, the material is said to be non-wetting to that liquid. As used herein, the material property of hydrophobicity shall refer to the non-wetting characteristic of the material by the liquid, regardless of what the liquid comprises. When the contact angle of water on a material is less than 90°, the material is said to be hydrophilic. The surfaces of most modern ships' hulls consist of steel, aluminium, fiberglass, copper, and copper-based paints are known to be hydrophilic.

In this invention, it is preferred that the outer surface should be hydrophobic. This ensures that the surface tension acts to resist water wetting the pressurised air pockets, as are described later. Preferred hydrophobic surfaces are Chlorosulfonated Polyethylene (CSM), Polychloroprene (CR), ethylene propylene diene monomer rubber (EPDM), thermoplastic polyurethane (TPU), perfluoroalkoxy copolymer resin (PFA) and polytetrafluoroethylene (PTFE). Many other fluoropolymers are also suitable. So too are materials such as silicone rubbers, fluoroelastomers, ePTFE, and waxes. PTFE and PFA both have the additional benefit of being resistant to fouling, which is also a desirable property for this invention. CSM, TPU and EPDM have the advantage that they are approved and used widely in the marine environment. These hydrophobic sealants may be used in combination with each other. For instance, CR may be used on the inner surface of the outer layer to provide good air tightness, and the more expensive CSM may be used on the outer surface of the outer layer to resist UV and ozone. EPDM and CSM are both mechanically tough and highly resistant to both ultraviolet light and ozone and are the most preferred sealants for marine applications.

Any reference to air, should be interpreted as any suitable gas and not limited to air. The gas may also comprise a biocidal gas, such as ozone mixed in a suitable concentration with air, when carrying out an anti-fouling treatment on the ship's hull. Such a treatment may be carried out from time to time as part of an anti-pollution program. When air is used, it should be dry, so that condensation does not form on any part of the air pumping system. Moist air should be dried by any suitable means, as known to those skilled in the art. The air should also be filtered to ensure that no particulates that could block the restrictors are forced though the compressed air system. The pressurised air may be supplied by a compressor, or from a storage tank. In the case of torpedoes, the compressed air may be the product of a chemical reaction.

In fluid mechanics, the term 'capillary length' is used to define the length scale below which the surface tension force of a liquid is significantly greater than the gravitational force. It is defined as the square root of the liquid's surface tension divided by its density multiplied by gravity. For water this value is 2.7 mm. This indicates that a drop of water falling through air will have a substantially spherical shape when its radius is less than 2.7 mm. It is observed that when the size of a single free-falling drop is more than double this it will tend to break up into smaller drops. This effect also applies to air bubbles in water. It should be noted that the capillary length of oil, at less than 2 mm, is less than that of water. This is primarily because the surface tension of water is substantially higher than that of oil. This invention establishes a substantially complete air phase within the pressurised air pocket, and aims not to allow the air to break up into separate air bubbles, as happens when the pocket diameter is significantly larger than the capillary length. To be most effective, the radius of the air pocket should be less than twice the capillary length. When the shape of the surface of the air pocket is not circular, the radius shall mean the radius of an equivalent circle of the same area.

It should be noted that the drawings shown are not to scale. The order of magnitude of ships is typically about 100 m long. The dimensions of a preferred airbag are in the region of ten meters long by one meter wide by 0.1 m thick. The rubber coating thickness is of the order of 1 mm thick, and the fibers are of the order of 0.1 mm diameter. The restrictors are of the order of 0.01 mm diameter. There is no way to represent these features that vary in size by seven orders of magnitude on the same drawings when such features are kept to scale. The drawings are for illustrative purposes only.

The cladding of FIG. 1 comprises at least one airbag. Pressurised air is supplied to the inlet of each airbag via inlet 106 which is supplied by an air distribution system. The airbag comprises a plenum, which is substantially void, wherein the air pressure is substantially uniform throughout when in operation. The plenum is connected to the outer layer by a multitude of small holes called restrictors herein. The plenum presents only a small obstruction to air flow. This is a necessary condition for the proper functioning of the airbag. The minor pressure variations across the airbag plenum are substantially smaller than the pressure drop across the restrictors. Were this not the case then the pressure drop across the restrictors adjacent to the air inlet of the plenum would be higher than the pressure drop across those restrictors at the farthest points from the air inlet. In such a situation, the airflow would only exit through the restrictors adjacent to the air inlet. Air would not flow through those restrictors furthest away from the air inlet. Those restrictors without air flow would become blocked, the water-expelling characteristics of the outer surface would be lost, and the viscous-drag reducing effects would be lost in that region. Convoluted air paths such as those through porous media cause significant pressure drops in operation, and are not suited to this invention.

In the case of air flow, a restrictor is the term used to describe a feature where there is a reduction in the cross-sectional area of the channel through which the air flows. It is instructive to compare the air flow rate though a channel plotted as a function of the pressure drop of an unrestricted flow compared with a restricted flow. Where the outlet is blocked, the outlet pressure encounters the full supply pressure in the case of both the unrestricted and the restricted flow. Where the outlet is not blocked, the pressure drop from the inlet to the outlet is the same, but the flow rate of the restricted flow is decreased. This decrease is largely in proportion to the ratio of the cross-sectional areas of the restricted channel to the unrestricted channel. In this invention, reduction in the combined cross-sectional area of the outlets of the airbag is achieved by forming a multitude of restrictor holes. The combined area of these restrictor holes must necessarily be small relative to the cross-sectional area of the airbag itself. It is useful in the design of the invented airbag to perform a simulation of the airflow using a software program such as ANSYS CFX or ANSYS Fluent, or similar software package. The power required to deliver the compressed air consumed can then be calculated, and usefully compared with the power saved by the reduction in viscous drag on the ship.

Referring to FIG. 1, the airbag shown therein is formed of a three-dimensional woven fabric, comprising an upper layer 101, a lower layer 102 and drop stiches 103 which connect the upper and lower layers. The fabric layers are sealed with at least one layer of rubber 104 and 105 on the upper and lower surfaces respectively. The edges are sealed with rubber layers 107. The airbag is supplied with pressurised air via inlet 106, preferably incorporating a non-return valve. The airbag may be mounted to the ship hull by means of the pressure sensitive silicone adhesive layer 107. The drop stitches are interwoven with the upper and lower layers and carry the structural load when the airbag is pressurised. The fiber materials of the drop stiches and upper and lower surfaces are chosen to suit the application. Where the airbag is designed to be subject to lower pressures, the drop stitches, along with the upper and lower yarns typically comprise polyester fibers. When subject to higher pressure, the outer surface may usefully comprise a multi-layer fabric, where one or more of the layers comprises an Aramid or Polyamide fiber. An interwoven structure is preferred as the mechanical loads are distributed across all yarns, however, a laminated structure may also be usefully employed. At least one layer of Aramid fiber is preferred for military applications when the airbag is designed to resist cutting and explosion, as well as hydrostatic pressures. Hybrid yarns comprising two or more fiber materials are also suitable.

Figure 2:
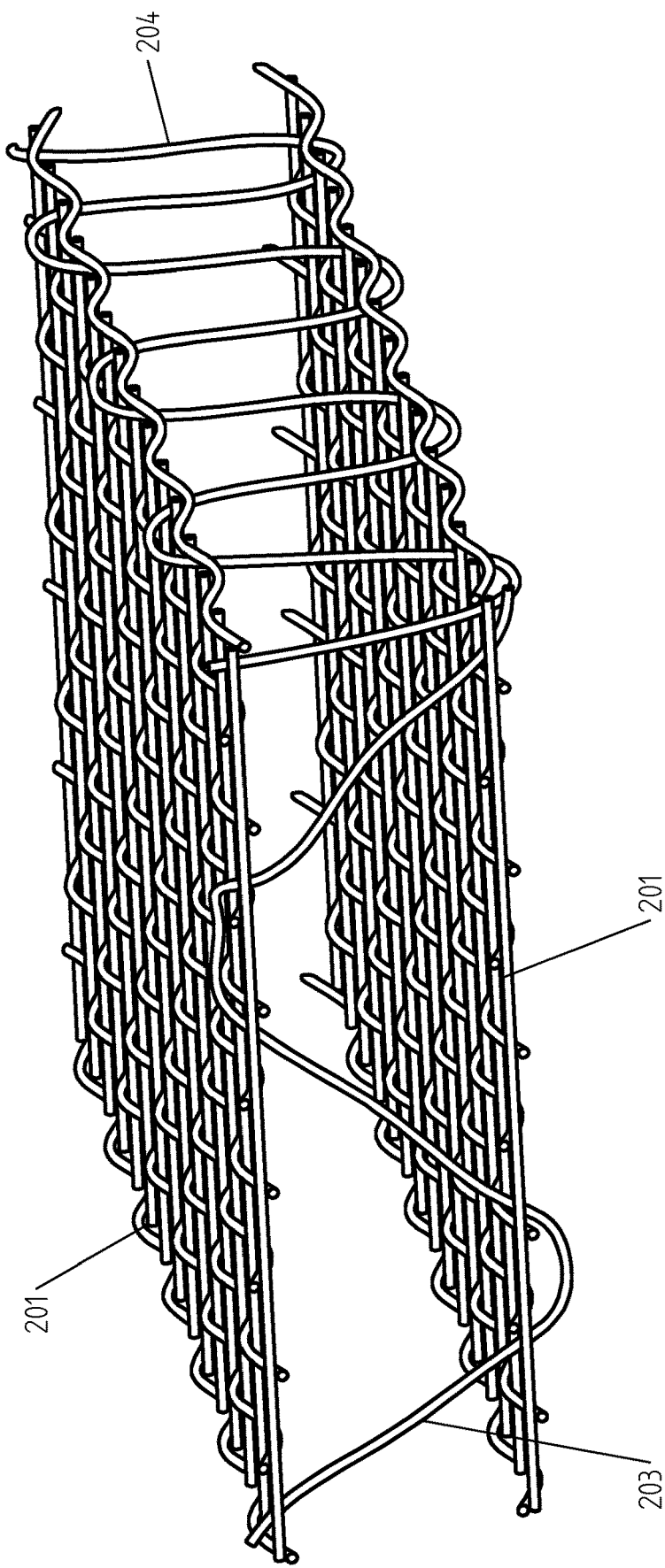
FIG. 2 illustrates an embodiment of reinforcing woven fabric using drop stitches.

For larger vessels subject to high airbag pressures, an airbag design incorporating drop stiches is preferred. This has the desirable feature that the outer surface of the ship clad with such airbags is the same as that of the ship hull itself, but merely offset by a given by the thickness of the airbag. In such a preferred design, as illustrated in FIG. 2, the upper surface layer 201 and lower surface layer 202 are connected by drop stitches 203 and 204 which are interwoven into both the top and bottom layers. The two surfaces are typically parallel, but existing 3d weaving technology allows for a large freedom in the design of both upper and lower surfaces. The number of drop stiches per square meter is adapted to carry the design load, and typically numbers in the tens of thousands per square meter. The diameter and material of the fiber used is similarly chosen. Referring to FIG. 2 when the drop stitches 204 are all substantially perpendicular to both the inner and outer layers, they provide little rigidity to the outer layer in the transverse plane i.e. the plane along the outer surface. Where additional rigidity of the outer layer is required, the drop stitches are woven at an angle to the outer layer as illustrated by the drop stiches 203. Thus known the construction of the fabric reinforcement is adapted to give the required rigidity.

Thus the illustrated three dimensional woven structure provides the invented airbag with structural strength to carry large structural loads while also providing a plenum which provides substantially no resistance to air flow.

For smaller vessels, it may be acceptable for the operation of the ship to employ airbags comprising substantially cylindrical surfaces. In that case, the outer surface layer is not subject not to any bending stress, but to hoop stress only. In such a case the airbag may comprise a reinforced surface layer only, and does not require reinforcing drop stitches. The reinforcing fabrics of cylindrical airbags are made cheaply by braiding or by forming a single sheet into a cylinder and bonding its two edges together. In the case of smaller vessels, a fabric-reinforced layer may usefully be battened and sealed onto the ship hull. This may be understood as an airbag whose bottom surface comprises the hull of the ship.

The outer surface of each airbag is adapted to be water-expelling.

Figure 3:
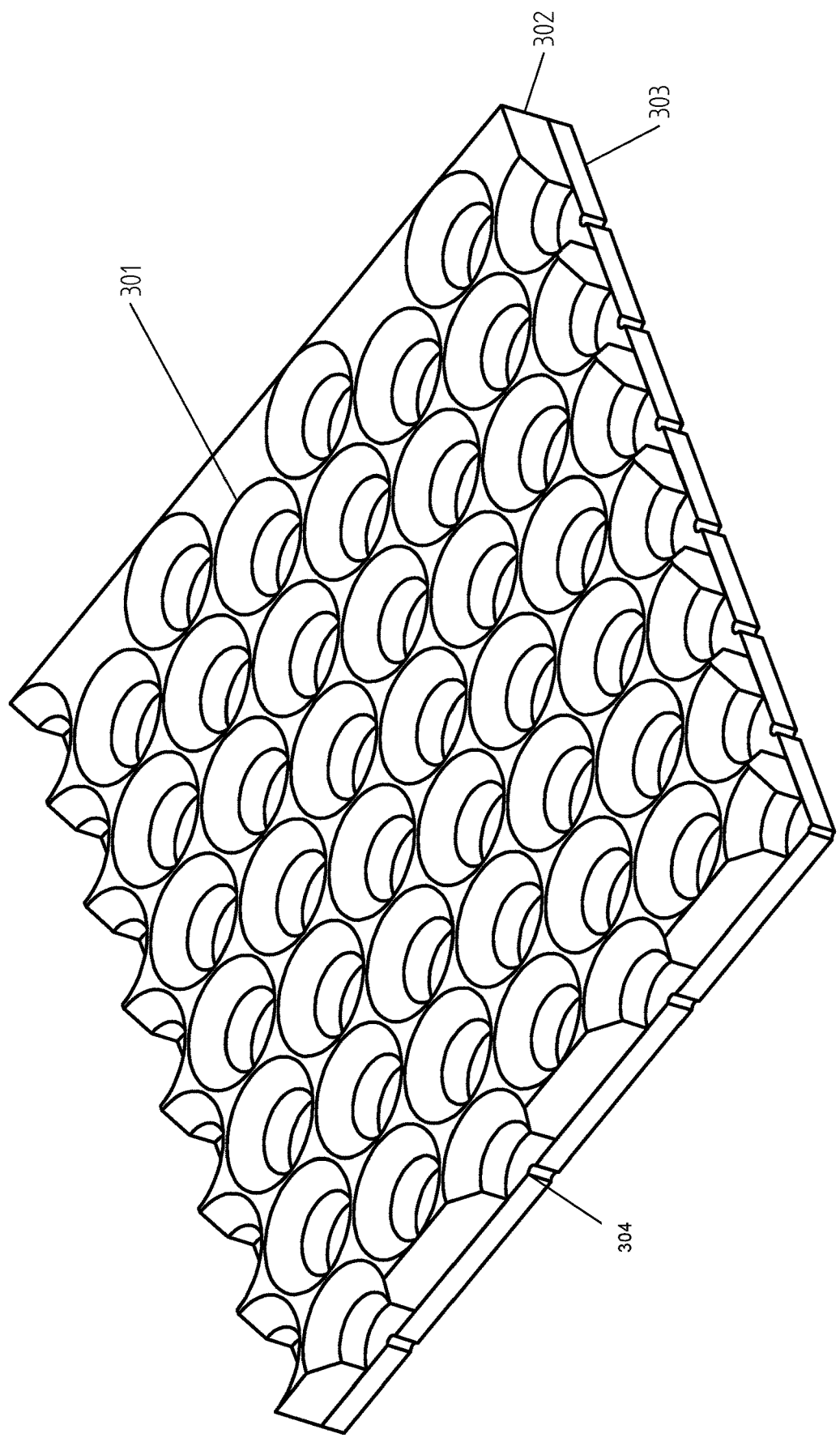
FIG. 3 illustrates an embodiment of densely packed pressurised air pockets suitable for positioning on the outer surface of the outer layer of an airbag of the present invention.

One embodiment of a water-expelling outer surface is illustrated in FIG. 3. The outer surface comprises a multitude of closely-packed air pockets 301. The outer surface layer is shown as a lamination of a pocket layer 302 and a base layer 303, but it can conveniently be formed as a single layer during the vulcanisation process. Restrictor holes 304 are formed in the base layer, and connect each pocket with the airbag plenum. Pressurised air flows from the plenum through each restrictor hole into the inside of each air pocket. The air pressure operates to keep water out of the pocket, and to eject any water that should enter the pocket. Should the outer surface of the pocket become blocked by water, the pressure in the pocket rapidly increases to that of the plenum. This pressure is greater than the local hydrostatic pressure, and clears the blockage, and prevents the pocket from becoming flooded. When the pocket is clear, the small diameter of the restrictor limits the total flow rate of air. As the pocket diameter is smaller than the capillary length of water, the pocket cannot partially fill with water, as would be the case with a large diameter pipe. Capillary forces act to ensure that each pocket is either filled with water, or filled with air. When the plenum pressure is higher than the hydrostatic pressure, the pocket is kept filled with air. This is the case even if the pocket surfaces lose their hydrophobicity. Thus, this surface is shown to be water-repelling.

Because the viscosity of air is about one thousand times smaller than that of water, the viscous drag over an air-filled pressurised air pocket is effectively eliminated. When multiple pressurised air pockets are on the hull's submerged surface, viscous drag is effectively eliminated on each of them. When multiple air pockets are packed together closely, viscous drag is greatly reduced over the area that they cover. By covering substantially all of the submerged area of the hull in pressurised air pockets, the overall viscous drag on the hull can be greatly reduced.

Figure 4:
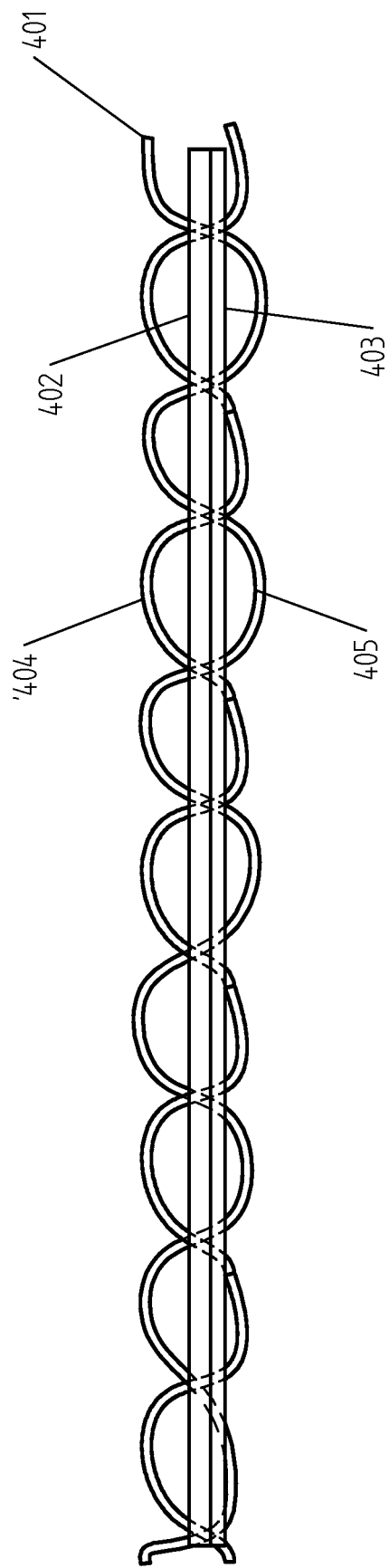
FIG. 4 illustrates an embodiment of restrictors formed by exposing the two ends of a hollow fiber.

The production of compressed air requires the consumption high levels of energy. The diameter of the restrictor is a key determinant of an economical viscous-drag-reducing system. Two favoured methods of producing them are the known methods of laser drilling and that of mechanical perforation. When producing restrictors in a thermoplastic polymer by mechanical perforation, it is useful to use hot needles. An embodiment of a restrictor made by an alternative method is illustrated in FIG. 4. The restrictors are produced by securely stitching a hollow fiber 401 into the upper layer 402 of the airbag, and then cutting it in such a way as to have one end free in the plenum, and the other securely located in the air-expelling layer. The fiber is illustrated in FIG. 4 is first stitched between the upper layer 402 and the lower layer 403, and loops of fiber 404 are formed in the upper layer. A layer of adhesive is then preferably applied to the upper layer to bond the fiber in position, and to seal the punctured holes in the rubber reinforced fabric. The fiber loops on the upper surface 404 are cut, exposing the inner hollow core. The fiber loops on the lower surface 405 then cut. The upper and lower layers are then pulled apart and separated, causing the cut fiber ends to pull through the lower airbag surface and to be left dangling freely in the airbag plenum. The hollow fiber is thus held securely in position with one end exposed in the airbag plenum, and the other on the outer surface, in what becomes a water-expelling layer when in operation. The restrictor fiber is preferably hydrophobic, or is treated to be hydrophobic. The hollow fiber is preferably of a material such as polyester, polyamide, polypropylene, polyethylene or other suitable polymer. Coated glass fiber is also suitable. Alternatively, this step can be accomplished by weaving the fiber into the fabric during the weaving process, rather than stitching it into the sealed fabric. The coating process is adapted accordingly.

Figure 5A:
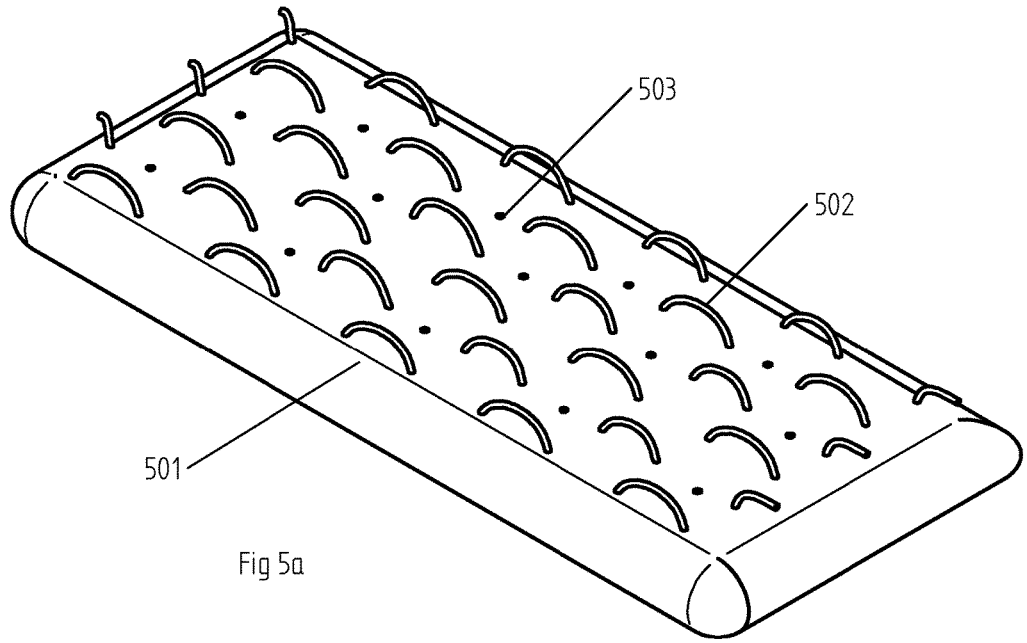
FIG. 5 illustrates an embodiment of hydrophobic loops suitable for use on an outer surface of an airbag of the present invention.

A further embodiment of a water-expelling layer is illustrated in FIG. 5a. The outer surface comprises a network of hydrophobic loops 502. These are woven into the upper surface layer of the airbag. Restrictors 503 connect the airbag plenum with the voids in the water-expelling layer. The water-expelling layer is adapted to be compliant so as to form a largely smooth surface at the interface with the water. The stiffness of the loops and the number of loops per square millimetre is adapted so that the height of the loops above the base layer 501 adapts to small changes in the differential pressure between the air pressure in the water-expelling layer and the surrounding hydrostatic pressure. The loops may be usefully be cut to form single strands of fiber. Alternatively, a fiber may be stitched into the upper surface of the fabric and its exposed end cut. Such processes are known processes within the textile industry. As used herein, the term 'loop' shall include closed loops, cut loops and cut stitches. The loops 502 are then coated by known means such as foam coating to increase their hydrophobicity. The restrictor holes 503 are formed in the base layer by the methods described above.

Figure 5B:
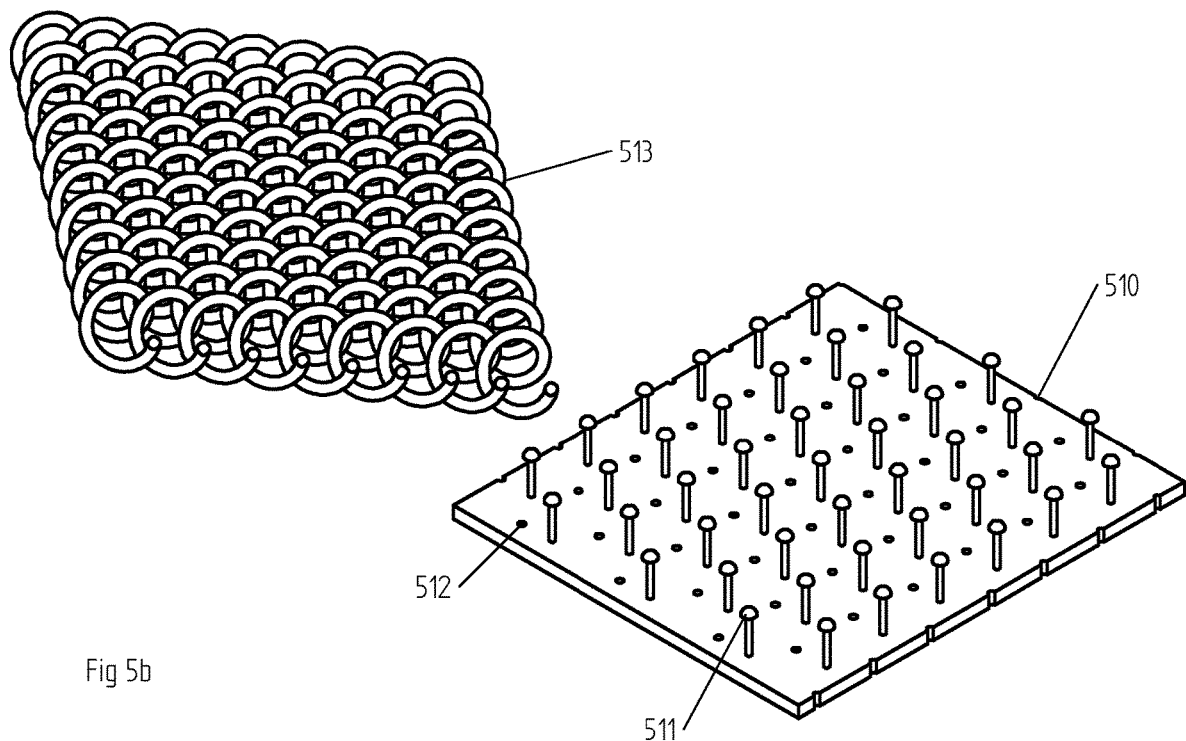

The known mechanical bonding system of hook and loop is also suitable and is illustrated in FIG. 5b. The mushroom-head hook layer 510 layer comprises a multitude of mushroom-shaped protrusions 511 and a multitude of restrictors 512. The mushroom-head hook layer 510 is adhesively bonded to the base layer of the top surface layer. In an alternative embodiment a layer of loops is first woven in the fabric of the upper layer. The loops are then cut to form hooks and stems.

A separate layer of loops 513 is then manufactured by known means, such as knitting, weaving or electrospinning. The layer of loops is then attached mechanically to the hook layer by pressing the loop layer into the hook layer and thus form a water-expelling layer. The advantage of manufacturing the loop layer separately is that should fouling occur at any part of the loop layer, it can be readily replaced in dry dock at minimal expense.

Preferred fibers for the loop materials are ePTFE, and polyester, polyethylene, polypropylene, polyamides and aramids. A hydrophobic coating of PFA or PTFE is preferably applied, except in the case of ePTFE.

When a wave crest causes the hydrostatic pressure to increase, the water-expelling layer is compressed resulting in an increase in the air pressure within its voids. The compressed air flows along the fibrous layer from higher pressure regions to lower pressure regions along the hull surface. This air flow is continuous, through both wave crests and wave troughs. The hydrostatic pressure encountered by a ship is greatest at the deepest part of the hull indicated as region 606 in FIG. 6 and drops towards the surface, and towards the aft portion of the ship indicated as region 607 in FIG. 6 when under way. The air flow within the water-expelling layer flows accordingly. As the hydrostatic pressure drops, the compliant water-expelling layer expands, and the air flow through it increases. The air pressure in the airbag plenum is adapted to be higher than the surrounding hydrostatic pressure throughout this cycle.

Figure 6:
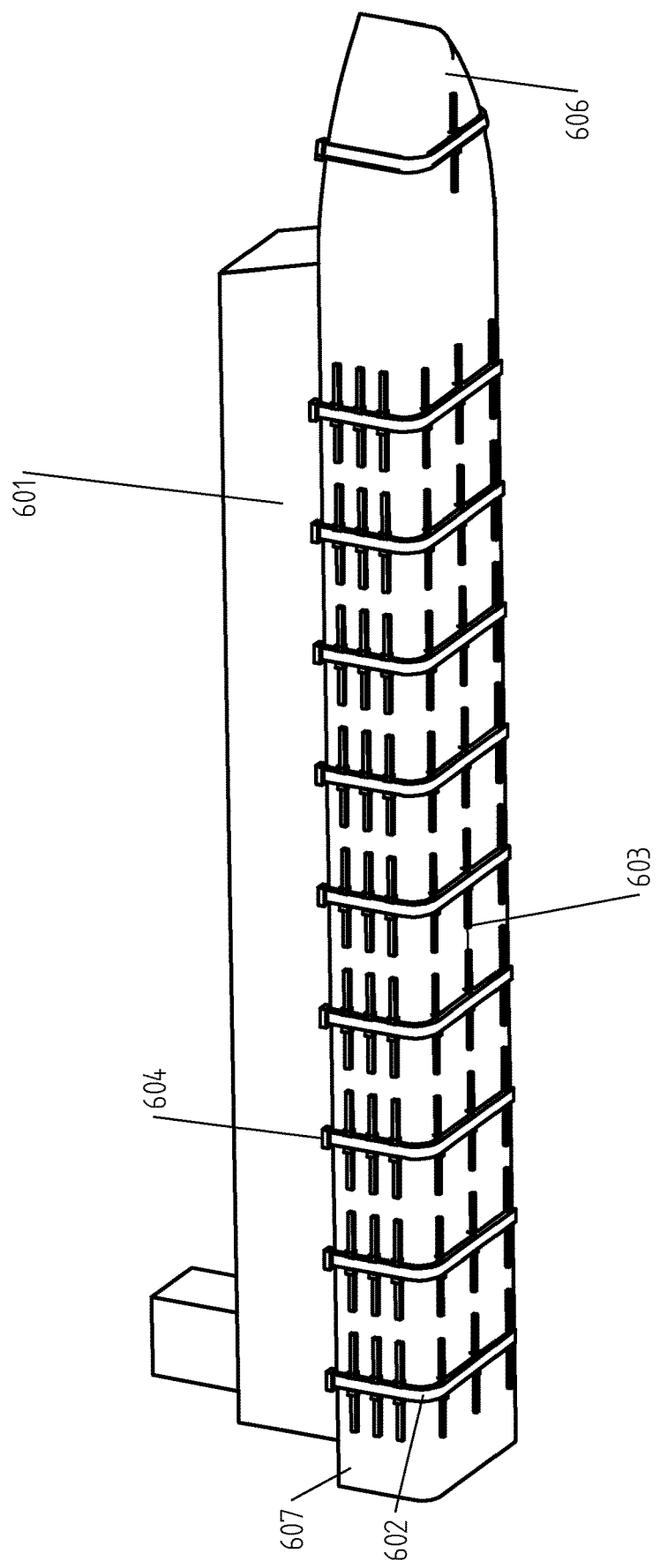
FIG. 6 illustrates a suitable embodiment of an air distribution network of a ship.

When retrofitting existing ships, fitting a pipe network internally throughout the submerged portion of the ship may not be feasible or desirable. An additional framework is attached to the external surface of the ship 601, as shown in FIG. 6. The framework is connected to a source of pressurised air at connections 604. The framework consists of a number of main channels 602, and with several subsidiary channels 603 connected to each one.

The reinforcing fabrics and the rubber sealants of this invention are known materials, and three dimensional weaving and the hydrophobic-coating processes described above are known processes. They are used in the manufacture of industrial items such as high-pressure lifting bags, and consumer items such as stand-up paddle boards, and parts for Rigid Inflatable Boats (RIBs), inflatable life rafts and the like. The reinforcing fabrics and the rubber sealants are used in heavy duty items such as the skirts for hovercrafts, and inflatable fenders for pilot boats have been proven to withstand the punishing marine environment over many years. This is a key advantage for this invention allowing for the rapid adoption in the market.

Knitted fabrics are cheaper and may be used instead successfully of woven fabrics in applications where the mechanical forces endured are less severe. Warp-knitted fabrics are more flexible and more open that woven fabrics. Weft-knitted fabrics tend to be even more open and flexible. In applications where the mechanical forces encountered by the fabrics are low and stable, or carried simply as hoop stresses, rubber sheets without any fabric reinforcement may be used. Woven fabrics are preferred for applications where higher forces are encountered, and where there is a requirement for higher rigidity and dimensional stability. Interlaced fibers give woven fabrics higher strength and rigidity. For further increases in strength and rigidity, multiple layers of interlaced fibers are used.

The airbags of the present invention are preferably electrically insulating to greatly reduce the anodic corrosion which is a large expense for metal ships. A further advantage is that the airbag cladding reduces noise transmission into the sea, from both engine and propellers, and from the ship's hull. Noise from shipping is now understood to disrupt marine life and interfere with fish reproduction. The airbag cladding reduces the power requirement from engines and propellers, and dampens noise from the hull. Those shilled in the art will recognise that this cladding provides protection against explosive attacks, as well as damage from grounding in shallow waters.

Variations in pressure occur due to the sea state. The sea pressure on any given point on the wetted area of the hull increases as a wave passes. For instance, a 10 m wave causes a 1 Bar pressure increase. The air pressure in the airbag is designed to be higher than the sea pressure at all times, even when subject to the increased load of a passing wave. The air supply pressure and flow rate, use of pressure sensors or non-return valves, and the elasticity of the airbag are readily adapted to achieve this. Safety pressure-release valves and drainage valves are also used to minimise risk of damage in the case of equipment failure. The above disclosed air distribution network delivers a controllable pressure and flow rate in a low-profile cladding system across the submerged area of the ship's hull. This makes it highly suitable as a cladding system for ships.

The present invention allows passive control through the optimum design of channels, chambers and orifices, however it is envisaged that known instrumentation such as pressure and flow sensors and regulators, control valves, and the like may be used to optimize the operation of this invention, particularly in large installations.

Viscous drag accounts for the large majority of the power required to propel most modern ships. By reducing the viscous drag, the power required for ships is reduced to the extent as to facilitate the adoption of other environmentally-friendly propulsion technologies to provide the remaining power requirements. The present invention facilitates the adoption of electric, sail and solar power so as to eliminate the emission of $CO_2$ and other pollutant gases in the shipping industry.

It has thus been shown that the present invention provides a means to reduce the wetted area of a ship's hull, and thus reduce the viscous drag it encounters. While particular embodiments of the invention have been illustrated, they are not intended to be limiting. Modifications and changes may become apparent to those skilled in the art, and it is intended that the invention be limited only by the scope of the appended claims.

What is claimed is:

1. A cladding for a ship hull comprising:
   at least one airbag comprising a plenum that comprises substantially open space which is pressurised with air in use;
   wherein said airbag is formed from a material comprising a reinforcing fabric that is substantially sealed with a sealant;
   the airbag further comprising an outer surface layer adapted to be water-expelling, the outer surface layer connected to the plenum via at least one restrictor hole in the airbag through which air from the plenum can pass to provide pressurised air in the water-expelling layer having a pressure level substantially equal to, or greater than, an adjoining hydrostatic pressure.

2. The cladding of claim 1, wherein said airbag is sealed with a vulcanised rubber.

3. The cladding of claim 2, wherein said vulcanised rubber is selected from at least one of CSM, CR, EPDM, Polyurethane or silicone.

4. The cladding of claim 1, wherein said airbag is sealed with a thermoplastic polymer.

5. The cladding of claim 4, wherein said thermoplastic polymer is selected from at least one of thermoplastic CSM or thermoplastic polyurethane.

6. The cladding of claim 1, wherein said reinforcing fabric comprises a woven fabric.

7. The cladding of claim 6, wherein said airbag comprises at least two layers of reinforcing fabric and drop stitching between said at least two layers of said reinforcing fabric.

8. The cladding of claim 1, wherein said reinforcing fabric comprises a fiber selected from at least one of polyester, para-aramid, meta-aramid, glass fiber, polyamide, polypropylene, PEEK, UHMPE, steel, or carbon fiber.

9. The cladding of claim 1, wherein said material comprises a laminate comprising at least one fabric-reinforced layer.

10. The cladding of claim 1, wherein said at least one restrictor hole is formed by mechanical perforation.

11. The cladding of claim 1, wherein said at least one restrictor hole is formed by laser drilling.

12. The cladding of claim 1, wherein said at least one restrictor hole is formed by feeding at least one hollow fiber through the airbag material such that one end of each hollow fiber terminates in said plenum, and the other end of each hollow fiber terminates in the water-expelling outer surface layer.

13. The cladding of claim 1, wherein the outer surface layer comprises means for forming closely packed air pockets on said outer surface layer, and where the radius of each air pocket is less than twice the capillary length of water, and wherein each air pocket is connected to said plenum by at least one restrictor hole.

14. The cladding of claim 1, wherein said outer surface layer comprises loops of hydrophobic fiber woven into the reinforcing fabric of said airbag material.

15. The cladding of claim 1, wherein said outer surface layer comprises a layer of hydrophobic loops attached to an outer side of said reinforcing fabric by adhesion bonding.

16. The cladding of claim 15 wherein said layer of hydrophobic loops of fiber is formed by means of one of weaving, knitting or electrospinning.

17. The cladding of claim 1, wherein said outer surface layer is adapted to be water-expelling by forming hooks on said upper surface layer, and separately forming a layer of hydrophobic loops of fiber by means of weaving or knitting or electrospinning, and attaching said hydrophobic loops to said hooks by pressing them together so they interlock and form a mechanical bond with each other.

18. The cladding of claim 14, wherein said hydrophobic loops are made of a material selected from one of ePTFE, polyester, polyamide, polypropylene, polyethylene or other hydrophobic polymer.

19. The cladding of claim 14, wherein said hydrophobic loops comprise a hydrophilic or weakly-hydrophobic fiber which is treated with a coating so as to increase its hydrophobicity.

20. The cladding of claim 19 wherein said fiber is selected from at least one of polyester, para-aramid, meta-aramid, glass fiber, polyamide, polypropylene, PEEK, UHMPE, steel, or carbon fiber.

21. The cladding of claim 19 wherein said coating is selected from one of PTFE, PFA, or wax.

\* \* \* \* \*